(12) United States Patent　　(10) Patent No.: US 9,122,914 B2
Xiong　　(45) Date of Patent: Sep. 1, 2015

(54) SYSTEMS AND METHODS FOR MATCHING FACE SHAPES

(71) Applicant: Tencent Technology (Shenzhen) Company Limited, Shenzhen, Guangdong (CN)

(72) Inventor: Pengfei Xiong, Guangdong (CN)

(73) Assignee: TENCENT TECHNOLOGY (SHENZHEN) CO., LTD., Shenzhen (CN)

(*) Notice: Subject to any disclaimer, the term of this patent is extended or adjusted under 35 U.S.C. 154(b) by 4 days.

(21) Appl. No.: 14/191,042

(22) Filed: Feb. 26, 2014

(65) Prior Publication Data

US 2014/0334738 A1　　Nov. 13, 2014

Related U.S. Application Data

(63) Continuation of application No. PCT/CN2013/087001, filed on Nov. 13, 2013.

(30) Foreign Application Priority Data

May 9, 2013　　(CN) .................... 2013 1 01691888

(51) Int. Cl.
　　*G06K 9/62*　　(2006.01)
　　*G06K 9/68*　　(2006.01)
　　*G06K 9/00*　　(2006.01)
　　*G06T 7/00*　　(2006.01)

(52) U.S. Cl.
　　CPC .......... *G06K 9/00288* (2013.01); *G06K 9/6202* (2013.01); *G06T 7/0085* (2013.01)

(58) Field of Classification Search
　　CPC .......... G06K 9/00288; G06K 9/00295; G06K 9/00308; G06K 9/00315; G06K 2009/00328; G06K 9/6202; G60T 7/0083
　　See application file for complete search history.

(56) References Cited

U.S. PATENT DOCUMENTS

| 5,982,912 | A  | * | 11/1999 | Fukui et al. | ................... | 382/118 |
|---|---|---|---|---|---|---|
| 2008/0181508 | A1 | * | 7/2008 | Kaneda et al. | ................ | 382/190 |
| 2010/0054550 | A1 | * | 3/2010 | Okada | ........................... | 382/118 |
| 2011/0158536 | A1 | * | 6/2011 | Nakano et al. | ................ | 382/190 |
| 2012/0014610 | A1 | * | 1/2012 | Nakashi et al. | ............... | 382/195 |
| 2013/0169827 | A1 | * | 7/2013 | Santos et al. | ............... | 348/207.1 |
| 2013/0259307 | A1 | * | 10/2013 | Torii et al. | ..................... | 382/103 |

* cited by examiner

*Primary Examiner* — Brian Le
(74) *Attorney, Agent, or Firm* — Brinks Gilson & Lione (57) ABSTRACT

Systems for matching face shapes may include a computer-readable non-transitory storage medium and an executing hardware unit. The storage medium may include a set of instructions for target object shape matching. The executing hardware unit may be in communication with the storage medium and may be configured to execute the set of instructions. The executing hardware unit may be configured to obtain a target object image for shape matching; determine a shape character of the target object image based on a shape of the target object image; determine similarities between the target object image and a plurality of template images of reference objects based on the shape character of the target object image and shape characters of the reference objects in the plurality of template images; and select a template image from the plurality of template images that has a largest similarity to the target object image.

18 Claims, 7 Drawing Sheets

SYSTEMS AND METHODS FOR MATCHING FACE SHAPES

RELATED APPLICATIONS

This application is a continuation of International Application No. PCT/CN2013/087001, filed on Nov. 13, 2013, in the State Intellectual Property Office of the People's Republic of China, which claims the benefit of Chinese Patent Application No. 2013101691888 filed on May 9, 2013, the disclosures of which are incorporated herein in their entirety by reference.

BACKGROUND OF THE INVENTION

1. Field of the Invention

The present disclosure relates to face recognition technology. Specifically, the present disclosure relates to systems and methods for matching face shapes.

2. Background

With developments of computer technology, face recognition technology becomes more and more mature. The present face recognition refers to computer technology which makes use of analysis and comparison of visual feature information of human face for authentication. Shape is one of the most direct expressions of an object. Objects with similar shapes are everywhere in daily life, and human faces are often used in comparison with other objects. For example, sometimes people describe the face of a person as an egg-shaped face or an oval face; and sometimes we just feel that the face of someone resembles a face of a pet dog. Describing human faces with particular objects is fun. It also makes the facial expression more profoundly understood.

SUMMARY OF THE INVENTION

According to an aspect of the present disclosure, a system for matching face shapes may comprise a computer-readable non-transitory storage medium and an executing hardware unit. The storage medium may comprise a set of instructions for target object shape matching. The executing hardware unit may be in communication with the storage medium and may be configured to execute the set of instructions. The executing hardware unit may be configured to obtain a target object image for shape matching; determine a shape character of the target object image based on a shape of the target object image; determine similarities between the target object image and a plurality of template images of reference objects based on the shape character of the target object image and shape characters of the reference objects in the plurality of template images; and select a template image from the plurality of template images that has a largest similarity to the target object image.

According to an aspect of the present disclosure, a computer-implemented method for shape matching may comprise obtaining, by at least one computer hardware unit, a target object image for shape matching; determining, by at least one computer hardware unit, a shape character of the target object image based on a shape of the target object image; determining, by at least one computer hardware unit, similarities between the target object image and a plurality of template images of reference objects based on the shape character of the target object image and shape characters of the reference objects in the plurality of template images; and selecting, by at least one computer hardware unit, a template image from the plurality of template images that has a largest similarity to the shape of the target object image.

BRIEF DESCRIPTION OF THE DRAWINGS

The above and other features and advantages will become more apparent by describing in detail example embodiments thereof with reference to the attached drawings in which.

DETAILED DESCRIPTION OF THE PREFERRED EMBODIMENTS

Example embodiments will now be described more fully with reference to the accompanying drawings, in which the example embodiments are shown. The example embodiments may, however, be embodied in many different forms and should not be construed as being limited to the example embodiments set forth herein; rather, the example embodiments are provided so that this disclosure will be thorough and complete, and will fully convey the concept of the invention to one skilled in the art. The drawings may be exaggerated for clarity and not necessarily in scale. Like reference numerals in the drawings denote like elements, and thus, their description will not be repeated.

Figure 11:
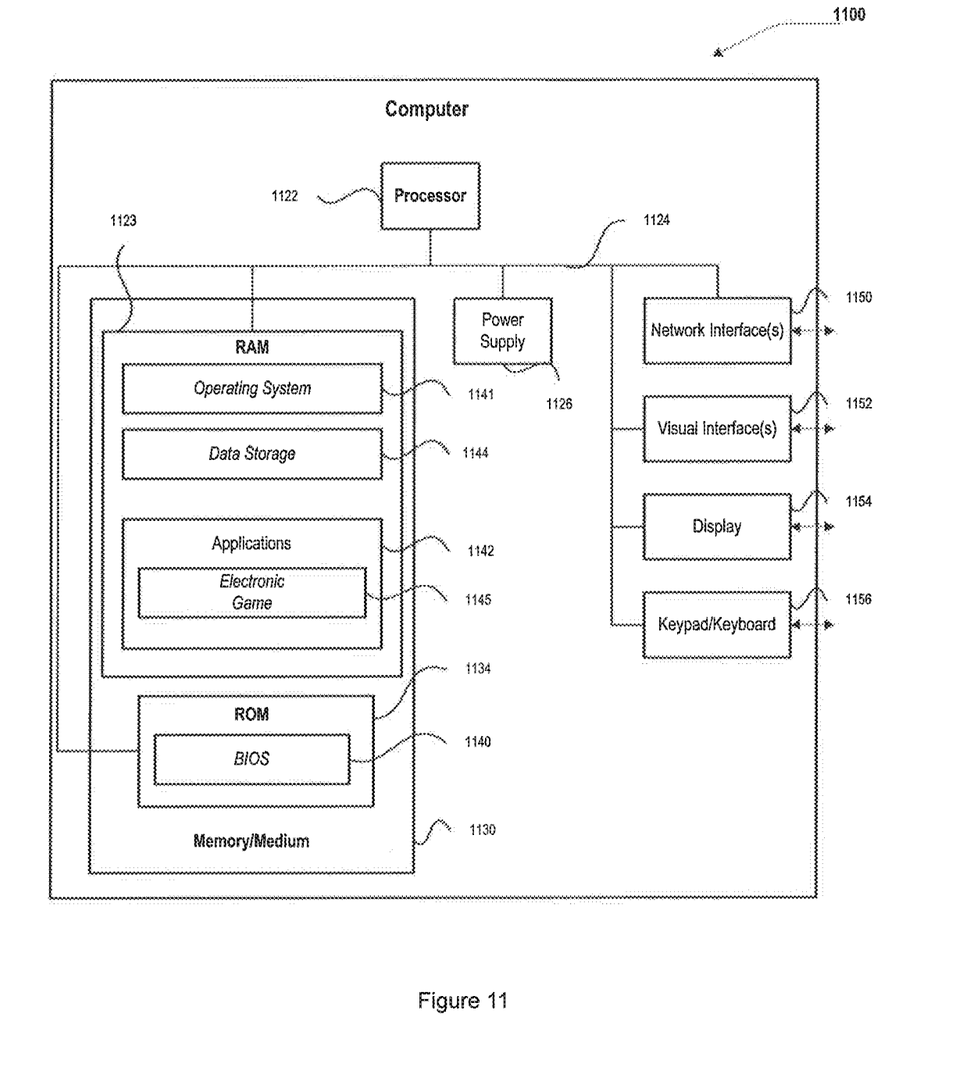
FIG. 11 is a schematic diagram illustrating an example embodiment of a computer.

FIG. 11 is a schematic diagram illustrating an example embodiment of a computer that may execute methods of the present disclosure. A computer 1100 may be a computing device capable of executing a software system. The computer 1100 may, for example, be a device such as a personal desktop computer or a portable device, such as a laptop computer, a tablet computer, a cellular telephone, or a smart phone. The computer 1100 may also be a server that connects to the above devices locally or via a network.

The computer 1100 may vary in terms of capabilities or features. Claimed subject matter is intended to cover a wide range of potential variations. For example, the computer 1100 may comprise a visual interface 1152, such as a camera. It may also comprise a keypad/keyboard 1156 and a display 1154, such as a liquid crystal display (LCD), or a display with a high degree of functionality, such as a touch-sensitive color 2D or 3D display. In contrast, however, as another example, a web-enabled computer 1100 may include one or more physical or virtual keyboards, and mass storage medium 1130.

The computer 1100 may also comprise or may execute a variety of operating systems 1141, including an operating system, such as a Windows™ or Linux™, or a mobile operating system, such as iOS™, Android™, or Windows Mobile™. The computer 1100 may comprise or may execute a variety of possible applications 1142, such as an electronic game 1145. An application 1142 may enable communication with other devices via a network, such as communicating with another computer via an Internet network for online electronic games.

Further, the computer 1100 may comprise one or more non-transitory processor-readable storage media 1130 and one or more processors 1122 in communication with the non-transitory processor-readable storage media 1130. For example, the non-transitory processor-readable storage media 1130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 1130 may store sets of instructions, or units and/or modules that comprise the sets of instructions, for conducting operations described in the present application. The one or more processors may be configured to execute the sets of instructions and perform the operations in example embodiments of the present application.

For example, the computer 1100 may comprise a main system module device, which may be comprised of the non-transitory storage medium, and a processor, which may be configured to execute a main system process. The computer 1100 may also comprise a subsystem process module device, which may also be comprised of a non-transitory memory and a processor configured to execute a subsystem process and to generate a user interface. The main system module device may create the subsystem process such that it is independent from the main system process. The main system module device may receive and send a user input to the subsystem process module device. The main system module device may generate a first computation result according to the user input. The subsystem module device may generate a second computation result that is in parallel with the main system process according to the user input. The main system process module device may receive the second computation result. The main system module device then may combine the first computation result and the second computation result as explained in more detail herein.

Merely for illustration, only one processor will be described in computers that execute operations in the following example embodiments. However, it should be note that the computers in the present application may also comprise multiple processors, thus operations that are performed by one processor as described in the present application may also be jointly or separately performed by the multiple processors. For example, if in the present application a processor of a computer executes both step A and step B, it should be understood that step A and step B may also be performed by two different processors jointly or separately in the computer (e.g., the first processor executes step A and the second processor executes step B, or the first and second processors jointly execute steps A and B).

Figure 1:
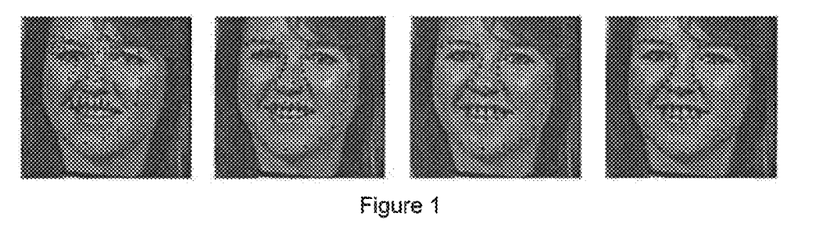
FIG. 1 illustrates an ASM iterative processing model for image shape acquisition.

FIG. 1 illustrates an ASM iterative processing for image shape acquisition. The ASM (Active Shape Model) Algorithm is an algorithm for positioning the shape of an object. The method may be stored in the non-transitory processor readable storage media 1130 as a set of instructions and executed by the processor 1122 in FIG. 11. The execution process may direct the processor 1122 to perform the following acts: first based on a reference shape of a human face, training and/or applying a global shape model and a local texture model, respectively, wherein the reference shape may be an image of a human face of which its shape has been demarcated; and then obtaining the position of the shape of the human face image through the following steps:

1) Setting an average shape of the global shape model as an initial face shape of a human being, with the same eye positions between the initial shape and the image, wherein the average shape may comprise by a plurality of shape point describing the face shape of a human being. For example, the average shape may be obtained by prior trainings. The prior trainings may also obtain shape model and texture model. For example, the face shape may comprise border lines (e.g., edges) of the face, nose, eyes of the face of the human being. After detecting the face on the image and locating eye position of the face on the image, the processor 1122 may set the eye positions of the initial shape to the eye positions of the face on the image, thereby applying the initial shape to the image.

2) Starting from the initial shape and based on the local texture model, searching in the vicinity of each shape point for the candidate point of which the texture feature is most similar to the texture feature of the shape point. For example, there may be a texture model that corresponds to each point of the initial shape. The texture model may provide a score for each point position. In all the neighbor points, the processor 1122 may choose one most similar to the texture feature of the shape point (e.g., with the highest score) as the candidate point.

3) Obtaining new face shape points by executing shape constraints and correction on all the searched shape points based on the global shape model.

4) Repeating steps 2)-3) until the difference of the shape points obtained by the most recent two iterations is less than a given threshold.

Figure 2:
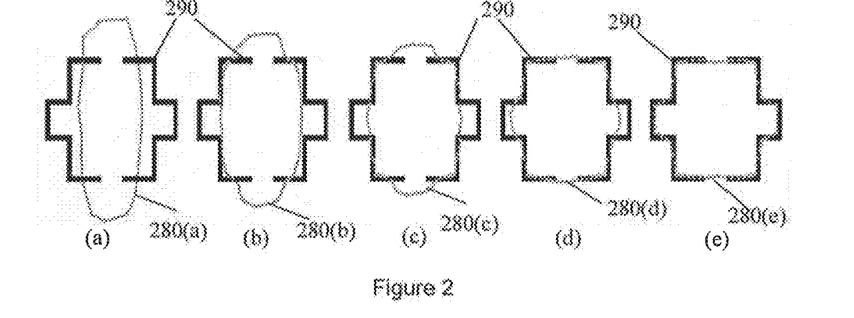
FIG. 2 illustrates a Snake model for extracting a shape.

FIG. 2 illustrates a Snake model for extracting a shape. The Snake model algorithm is an iterative algorithm. Starting from a given group of initial points 280($a$), the Snake model may be used on a shape to achieve maximum gradient of the whole shape. The algorithm may be stored in the non-transitory processor readable storage media 1130 as a set of instructions and executed by the processor 1122 in FIG. 11. The stored algorithm may direct the processor 1122 to perform the following acts:

1) Arbitrarily initializing a group of shape points 280($a$), wherein the group of shape points 280 forms an initial shape and each shape point in the group of shape points corresponds with an image pixel;

2) For each shape point in the group of shape points 280($a$), computing a gradient direction of the corresponding image pixel, and move the shape point along the direction of the gradient. The moved group of shape points may result an updated shape. For example, the group of shape points 280($a$) may be an updated shape of the group of shape points 280($b$);

3) Computing an overall energy function of the updated shape and adjust the updated shape accordingly. The energy function may be expressed as, $$E=f(x,y)=\Sigma(\alpha(x,y)'+\beta(x,y)''-|\nabla I(x,y)|^2)$$

where $(x,y)'$ and $(x,y)''$ are first-order and second-order derivatives of point $(x,y)$, and $\nabla I(x,y)$ are divergence of this point.

4) Repeating steps 2)-3) until the updated shape converges to the shape 290 of the image. FIG. 2(*a*) to FIG. 2(*e*) illustrates the course of the convergence.

Figure 3:
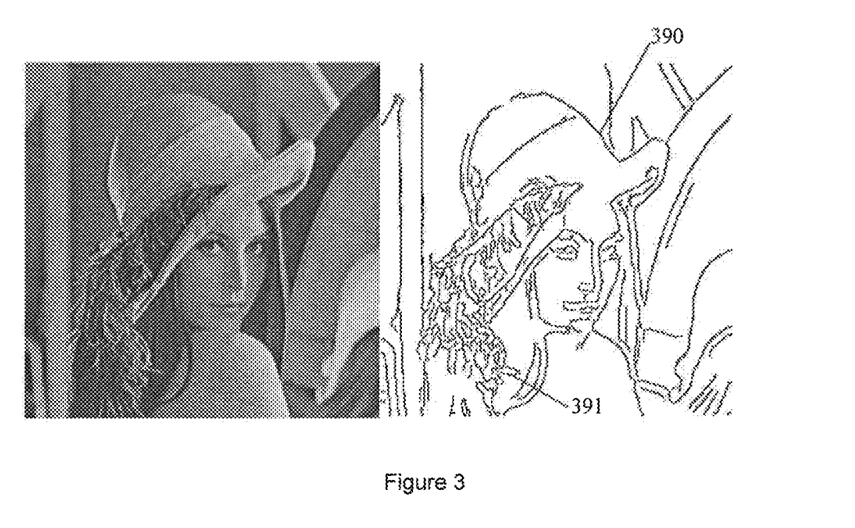
FIG. 3 illustrates a Canny model for obtaining image edges.

FIG. 3 illustrates a Canny model for obtaining image edges. Canny is a method of gaining image edges. An algorithm implementing the Canny model may be stored in the non-transitory processor readable storage media 1130 as a set of instructions and executed by the processor 1122 in FIG. 11. The stored algorithm may direct the processor 1122 to perform the following acts:

1) Executing Gaussian blurring on an image to remove image noises;

2) Applying four masks on the image to respectively execute image convolution along horizontal, vertical and two diagonal directions of the image; and then identifying those brighter points in the image as the candidate edge points;

3) Obtaining the image shape by selecting the edge points.

Figure 4:
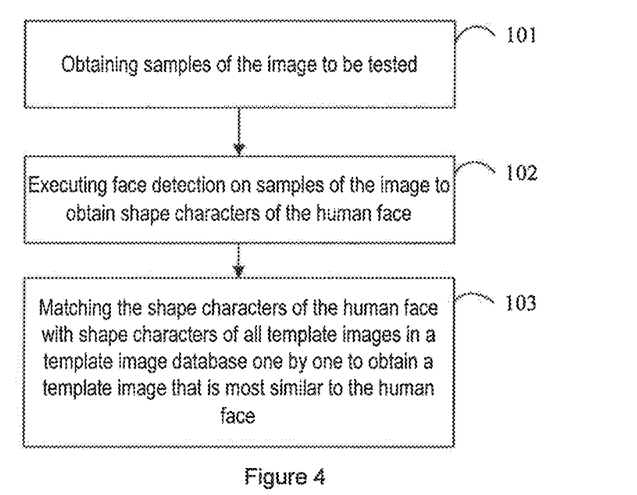
FIG. 4 is a flow diagram of a method for matching face shapes according to example embodiments of the present disclosure.

FIG. 4 is a flow diagram of a method for matching facial shapes according to example embodiments of the present disclosure. The method may be stored in the non-transitory processor readable storage media 1130 as a set of instructions and executed by the processor 1122 in FIG. 11. The stored method may direct the processor 1122 to perform the following acts:

101. Obtaining a sample of visual document to be tested. For example, the sample may be an image, such as a face image of human being. The sample may also be a picture or video stream.

102. Executing face detection on the sample to obtain and/or determine characters of the human face. For example, the characters of the human face may be characters of the face shape (shape characters). The face shape may be border lines (e.g., edges) of the face, nose, eyes of the face of the human being, or a combination thereof. For example, if a person has a big nose than average persons, the border lines of his/her nose in an image may be bigger than an image of an ordinary person and may be a character of his/her face shape. Further, the face shape may comprise by a plurality of shape points describing the border lines. Accordingly, the shape characters of a face may be represented by the plurality of discrete shape points and/or coordinates of the plurality of shape points of the face shape. For example, if any two shape points that are adjacent to each other and are along a border line of the same organ form a vector, the shape characters of the face may be described by a group of vectors;

103. Matching and/or comparing the shape characters of the human face with shape characters of all template images stored in a template image database one by one, and obtaining a template image that may resemble most similar to the human face. The template image database may be stored in one or more non-transitory processor-readable storage media 1130.

Prior to obtaining the sample image to be tested, the method may also direct the processor 1122 to perform acts of:

Establishing the template image database. The template image database may comprise shape characters of template images.

Establishing the template image database may comprise:

Obtaining images of various objects with various shapes, capturing the main body of each image, and obtaining standardized template images for these objects. The main body of an image may be a portion of the object in the image that is of interest. For example, if the image is a half portrait of a dog, the main body of the image may be the face and/or head of the dog. A standardized template image may be an image that includes only the main body. The standardized template image may also be tuned and/or cropped from the original image so that the main body in the standardized image satisfied certain pre-determined requirements. For example, a standardized template image may be defined as an image with a size of 1000×1000 pixels, wherein the main body is in the center thereof and the upper and lower boundaries of the main body are 100 pixels away from the upper and lower boundaries of the standardized template image, respectively;

Extracting and/or determining the shape characters for every standardized template image;

Saving the shape characters corresponding to every standardized template image in the template image database.

According to the example embodiments of the present disclosure, the standardized template images comprise but not limited to pet class images and/or food class images.

According to the example embodiments of the present disclosure, the processor may extract and/or determine the shape characters of every standardized template image, the method may comprise:

Obtaining the main shape of every standardized template image. For example, when there are multiple objects in the standardized template image, the shape in the middle of the image may be choose as the main shape;

Extracting and/or determining shape characters of the template image according to the main shape of the template image. The shape characters of the template image may have the same definition as the shape characters of the face shape.

In order to obtain the main shape of every standardized template image, the method may direct the processor 1122 to perform acts of:

Obtaining the main shape of the standardized template image by training the processor 1122 with ASM Algorithm of face shapes when the standardized template image is pet class image (e.g., applying the ASM Algorithm on the standardized template image);

Obtaining the main shape of the standardized template image by training the processor 1122 with the Snake Model Algorithm for positioning the outer boundary shape when the standardized template image is food class image (e.g., applying the Snake Model Algorithm on the standardized template image);

When the standardized template image is an image with a fuzzy contour or edge, obtaining the edge of the main shape by Canny edge detection method (e.g., applying the Canny edge detection method on the standardized template image). The edge of the main shape obtained by Canny edge detection method may not be smooth enough, i.e., the edge may comprise a plurality of small edges (i.e., noises, e.g., small edges 391 in FIG. 3), where in the small edges may be edges comprising edge length less than a given threshold value. Accordingly, the processor 1122 may smooth the main shape edge by filtering out the small edges.

In order to extract and/or determine shape characters of the template image according to the main shape of the template image, the method may direct the processor 1122 to perform acts of:

Conducting geometric blurring on the main shape of every template image to obtain a blurred shape that corresponds to the template image;

Conducting sampling on the blurred shapes that corresponds to the template image, and obtaining the shape characters of the template image. The shape characters may comprise coordinates of discrete points and descriptors of the geometric blurring ("geometric blurring descriptors").

In order to match and/or compare the shape characters of the human face with the shape characters of all the template images in the template image database one by one to obtain the template image that is most similar to the human face, the method may direct the processor 1122 to perform acts of:

Obtaining differences between blurring operators for the human face shape characters and blurring operators for shape characters of every template image, based on the geometric blurring descriptors of the human face shape characters and the geometric blurring descriptors of every template image in the template image database. The blurring operators are described in step 202.

Obtaining differences of the matching shape between the shape characters of human face and the shape characters of every template image in the template image database according to the discrete point coordinates of the shape characters of the human face and the discrete point coordinates of every template image (i.e., obtaining difference of the shape between human face and the reference object in the template image).

Obtaining similarities between the shape characters of human face and the shape characters of every template image according to the above differences of blurring operators and the above differences of matching shape.

Obtaining the maximum similarity value from the above obtained similarities and providing the template image corresponding to this maximum similarity value as the most similar template image to the human face.

Thus, according to the example embodiments of the present disclosure, the processor 1122 may execute face detection on samples of the images to obtain the shape characters of the human face; match and/or compare the shape characters of the human face with the shape characters of all the template images in the template image database one by one to obtain the template image that is most similar to the human face, thus realizing the detection of objects similar to the human faces.

Figure 5:
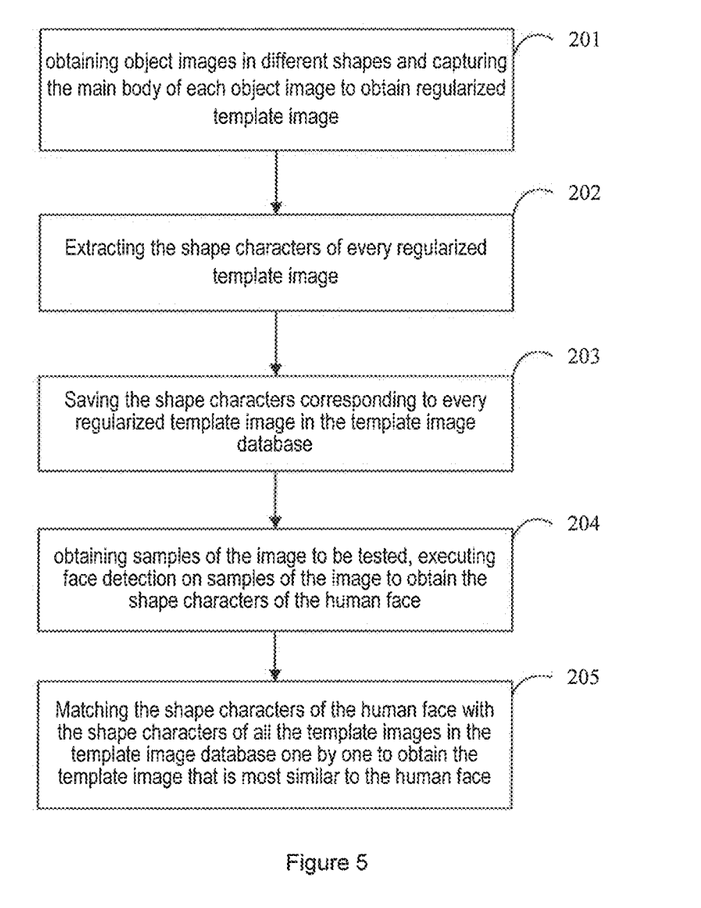
FIG. 5 is a flow diagram of another method for matching face shapes according to the example embodiments of the present disclosure.

FIG. 5 is a flow diagram of a method for matching facial shapes according to example embodiments of the present disclosure. The method may be stored in the non-transitory processor readable storage media 1130 as a set of instructions and executed by the processor 1122 in FIG. 11. The stored method may direct the processor 1122 to perform the following acts:

201. Obtaining images of various objects with different shapes and capturing the main body of each object image to obtain standardized template image.

According to the example embodiments of the present disclosure, the processor 1122 may establish a template image database comprising objects with different shapes, and may retrieve in the database the object of which the shape resembles most similar to the shape of the face for any human being. The template images may be categorized according to their shapes. For example, the template images may be categorized as, but are not limited to, animal, food, furniture, and plant, etc. For illustration purposes only, the example embodiments in the present disclosure only involve two categories: pet class and food class. Pet class images may comprise different types of pets such as cats, dogs, mice, etc.; food class images may comprise pictures of objects in daily life, such as watermelon seeds, duck eggs, etc.

The processor 1122 may obtain images of objects with different shapes, such as cats, dogs, watermelon seeds, etc. The processor 1122 then may capture image of the main body in these object images, such as pet's faces, to obtain a standardized template image. After obtaining the standardized template image, the processor 1122 may execute lighting operations and theme strengthening operations on the template images to make each of the template images only contain a single object under a single background, and reduce the background information.

202. Extracting the shape characters of every standardized template image.

In this step, the processor 1122 may extract and/or determine the shape characters of every standardized template image. To this end, the processor 1122 may first obtain the main shape of every standardized template image; and then extract and/or determine the shape characters of the template image according to the main shape of the template image.

According to the example embodiments of the present disclosure, the standardized template images may be categorized into three classes: the first class of images may be human face images including clear pet images, which may have the similar facial characters to that of the human face, the main shape in the first class images may be obtained via training the processor 1122 under ASM algorithm. The second class of images may be images with clear main contours, including food class images that have a simple shape. The main shape of the second class images may be obtained via training the processor 1122 under the Snake model algorithm to identify the boundary of the main shape. The third class images may be images with a fuzzy contour. The main shape of the second class images may be obtained by first training the processor 1122 under Canny edges detection method to obtain the contour of the main shape, and then further filtering out small edges of the main shape.

In obtaining the main shape of every standardized template image, the processor 1122 may perform the acts of:

Obtaining the main shape of the standardized template image by training the processor 1122 with the ASM Algorithm of face shapes when the standardized template image is pet class image;

Obtaining the main shape of the standardized template image by training the processor 1122 with Snake Model Algorithm to position the outer boundary shape when the standardized template image is food class image;

Obtaining the main shape of the standardized template image by performing Canny edge detection method to obtain the edges of the template image and then filtering out the small edges of the edges of the template image, when the standardized template image is the image with a fuzzy contour.

Furthermore, after obtaining the main shape of the template image, the processor 1122 may extract and/or determine the shape characters of the template image according to the main shape of the template image. To this end, the processor 1122 may perform the acts of:

Conducting geometric blurring on the main shape of every template image to obtain blurred shape corresponding to the template image;

Conduct sampling on the blurred shapes corresponding to the template image to obtain the shape characters of the template image which include discrete point coordinates and geometric blurring descriptors, which are introduced below.

According to the example embodiments of the present disclosure, after obtaining the face shape points, the processor 1122 may execute geometric blurring on the face shape and extend the original shape into a shape with redundancy change so as to obtain the shape characters of the human face.

Figure 6:
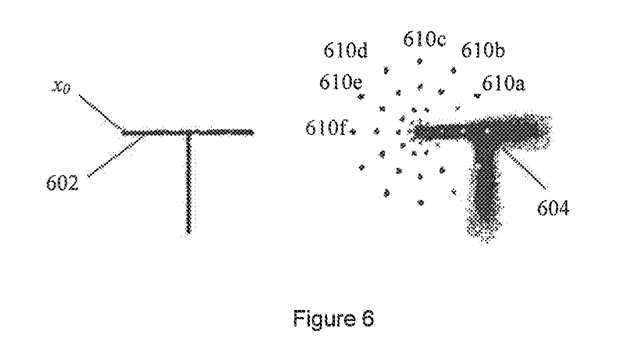
FIG. 6 is a schematic diagram of geometric blurring according to the example embodiments of the present disclosure.

FIG. 6 shows the schematic diagram of blurring an original shape 602 to a blurred shape 604 by conducting geometric blurring on the shape. The processor 1122 may adjust a blur factor $B_{x_0}(x)$ based on the distance between a blur point $x_0$ and the corresponding original shape point in the blurring process. The farther the blur point from the original shape point, the larger the blur factor is, i.e., the more severe blurring.

$$B_{x_0}(x)=S_{ax+b}(x_0-x), \quad 1)$$

wherein $x_0$ represents the original shape point, x represents the blur point, $B_{x_0}(x)$ represents the blurriness of x compared to $x_0$. For arbitrary point $x_0$, blur point x may exist in any direction ax+b of the point. Here ax+b represents a straight line that passes through point x. Thus straight lines ax+b with different values of a and b may point towards different directions, as shown by 610a-610 in FIG. 6. Next, the processor 1122 may conduct sampling on each of the straight lines to get a group of blur points x' along the straight lines, wherein the blurriness of points $x_0$ compared to x is $B_{x_0}(x)$. A number of groups of discrete blur points and blurriness of every point compared to the original point may be obtained based on different a and b. After that, the processor 1122 may conduct sampling on the blurred shape to acquire the image features represented by discrete point coordinates and geometric bluffing descriptors.

203. Saving the shape characters corresponding to every standardized template image in the template image database.

According to the example embodiments of the present disclosure, after extracting and/or determining the shape characters of the template image, the processor 1122 may save every template image and its corresponding shape characters in the template image database, so that the processor 1122 may search and retrieve the face shape characters.

As set forth above, steps 201-203 are the processes of establishing the template image database, which comprises the shape characters of template images. Steps 201-203 may not need to be repeated if the template image database has been established.

204. Obtaining samples of the image to be tested, wherein the image may include a human face, and executing face detection on samples of the image to obtain the shape characters of the human face.

In this step, the processor 1122 may execute face shapes matching and obtain samples of the images to be tested, wherein the images to be tested may be pictures or video streams collected by cameras.

Figure 7:
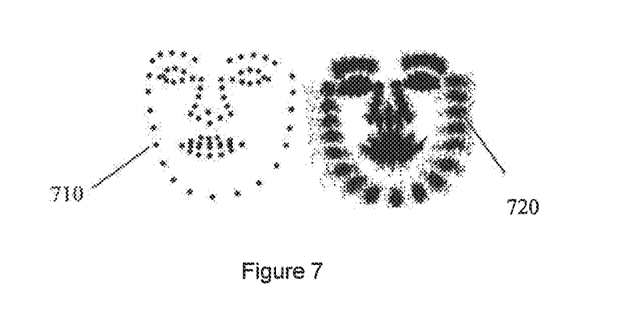
FIG. 7 is a schematic diagram of extracting human face shape according to the example embodiments of the present disclosure.

After obtaining a sample image to be tested, the processor 1122 may first conduct face detection and/or locating eyes on the image. For example the processor 1122 may obtain the position of a frame of the face in the image by adopting method of adaboost classifier and haar features, and then further locate the positions of the eyes in the frame of the face, and then determine the face shape via ASM algorithm. The face shape may comprise, but is not limited to, a plurality of points (shape points) locating on boundary of organs on the face, such as contour of the face, eyes, nose, and mouth. As shown in FIG. 7, after conducting positioning on the face shape via ASM algorithm, the processor 1122 obtains the face shape points 710.

Furthermore, the processor 1122 may extract and/or determine the shape characters of the human face according to the face shape. To this end, the processor 1122 may execute geometric blurring on the face shape to obtain a blurred shape 720 corresponding to the human face; and conduct sampling on the blurred shapes corresponding to the human face to obtain the shape characters of the human face, the face shape may include discrete point coordinates and geometric blurring descriptors, etc.

The blurring process may be similar to the blurring process of the template image in step 201.

205. Matching and/or comparing the shape characters of the human face with the shape characters of all the template images in the template image database one by one to obtain the template image that is most similar to the human face.

After obtaining the shape characters of the human face in this step, the processor 1122 may match and/or compare shape characters with the shape characters of every image in the image template in order to acquire an object which is most similar to the human face.

To this end, the processor 1122 may match and/or compare the shape characters of the human face with the shape characters of all the template images in the template image database one by one to obtain the template image that is most similar to the human face. Accordingly, the processor 1122 may perform acts of:

Obtaining the difference between bluffing operators of the shape characters of human face and bluffing operators of the shape characters of every template image in the template image database, according to the geometric bluffing descriptors of the shape characters of the human face and the geometric bluffing descriptors of every template image.

Obtaining a shape difference between the shape characters of human face and shape characters of every template image, according to the discrete point coordinates of the shape characters of the human face and the discrete point coordinates of every template image.

Obtaining the similarity between the shape characters of human face and the shape characters of every template image in the template image database according to the difference of blurring operators between the shape characters of the human face and the shape characters of every template image, and according to the difference of matching shape between the shape characters of human face and the shape characters of every template image.

Obtaining the maximum similarity value from the obtained similarities and output the template image corresponding to this value as the most similar template image to the human face.

According to the example embodiments of the present disclosure, the similarity $Dist(x_1,x_2)$ between any two groups of features may be completed by the bluffing operator difference and the difference of matching shape, as shown in Equation 2):

$$Dist(x_1,x_2)=w_m f_m(x_1,x_2)+w_d f_d(x_1,x_2); \quad 2)$$

wherein $w_m$ and $f_m$ correspond to the differential weight of geometric bluffing and difference function in the features of the two groups, respectively; $w_d$ and $f_d$ correspond to the differential weight of shape and difference value between the features, respectively; the sum of $w_m$ and $w_d$ is 1.

Because each group of the shape characters may be represented by positions of discrete points in the shape, any two closely adjacent points (e.g., points along the border of nose, face, and eyes) may form a vector. Therefore each group of shape characters may be expressed by a group of such vectors. For any two groups of the shape characters, the processor 1122 may determine the difference between corresponding pairs of vectors in the two groups (e.g., the processor 1122 may compare a vector in the first group with a vector in the second group that corresponds to the vector in the first group). The difference may be expressed as a vector as well (e.g., a vector pointing from one vector to the other vector). The processor 1122 may determine two eigenvalues for each difference: intersection angle of vectors $d_a$ and length difference $d_l$, so the difference of matching shape characters are:

$$f_d(x_1,x_2)=\Sigma r d_a(x_1,x_2)+\Sigma(1-r)d_l(x_1,x_2); \quad 3)$$

The difference of geometric bluffing operators are determined by blurriness of every pixel, $$f_m(x_1,x_2)=f(B_{x_1},B_{x_2});\qquad\qquad 4)$$

According to the example embodiments of the present disclosure, the processor 1122 may compute the similarity Dist($x_1,x_2$) between two groups of shapes according to the difference of blurring operators of shape characters of the human face in the image to test and the difference of blurring operators of shape characters of each template image. Then the processor 1122 may find the maximum similarity value based on the similarities Dist($x_1,x_2$) between the image to test and the template images in the template image database, and retrieve the template image which is most similar to the entered human face in the image to test, treat the template as the output template image.

Figure 8:
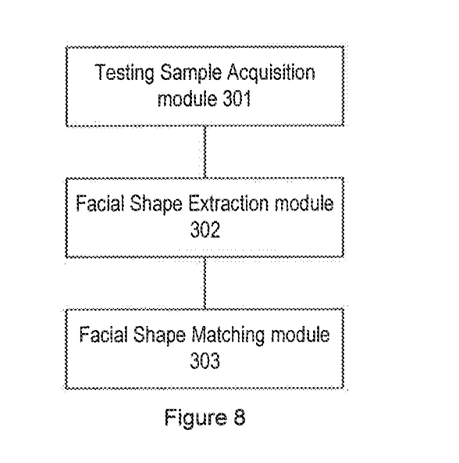
FIG. 8 is a schematic diagram of a system for matching human face shapes according to the example embodiments of the present disclosure.

FIG. 8 is a schematic diagram of a system for matching human face shapes according to example embodiments of the present disclosure. The system may comprise: Testing Sample Acquisition module 301, Face Shape Extraction module 302, and Face Shape Matching module 303. Testing Sample Acquisition module 301 may be configured to obtain a sample of an image of human face to be tested; Face Shape Extraction module 302 may be configured to detect on the sample to obtain the shape character of the human face; and Face Shape Matching module 303 may be configured to match and/or compare the shape characters of the human face with the shape characters of all the template images in the template image database one by one to obtain the template image that is most similar to the human face.

Figure 9:
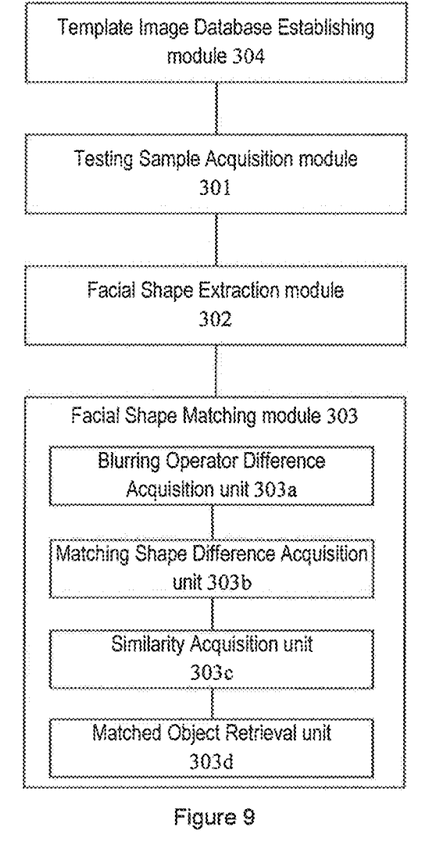
FIG. 9 is a schematic diagram of a system for matching human face shapes according to the example embodiments of the present disclosure.

FIG. 9 is a schematic diagram of a system for matching human face shapes according to example embodiments of the present disclosure. In addition to the modules in FIG. 8, the system in FIG. 9 may further comprise Template Image Database Establishing module 304, which may be configured to establish the template image database before the sample of the image to be tested were obtained by Testing Sample Acquisition module 301.

Figure 10:
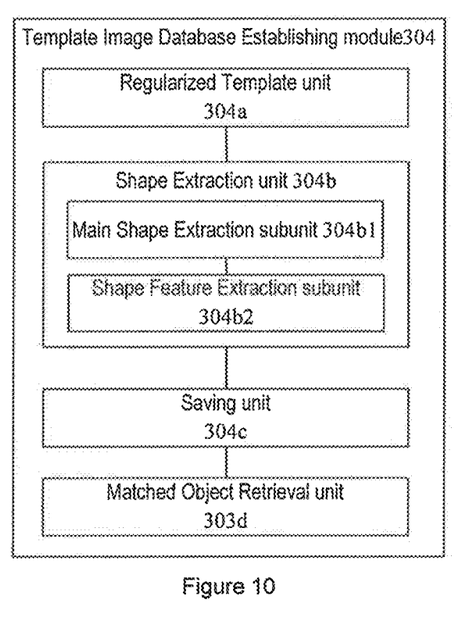
FIG. 10 is a schematic diagram of a Template Image Database Establishing module according to example embodiments of the present disclosure.

FIG. 10 is a schematic diagram of the Template Image Database Establishing module 304 according to example embodiments of the present disclosure. The Template Image Database Establishing module may comprise Standardized Template unit 304a, which may be configured to obtain images of objects in different shapes and capturing the main body of the object in each image to obtain a standardized template image; Shape Extraction unit 304b, which may be configured to extract and/or determine the shape characters of every standardized template image; and Saving unit 304c, which may be configured to save the shape characters corresponding to every standardized template image in the template image database. According to the example embodiments of the present disclosure, the standardized template images may comprise, but are not limited to, pet class images and/or food class images.

Further, as shown in FIG. 10, Shape Extraction unit 304b may comprise Main Shape Extraction subunit 304b1, which may be configured to obtain the main shape of every standardized template image; and Shape Feature Extraction subunit 304b2, which may be configured to extract and/or determine the shape characters of the template image according to the main shape of the template image.

The Main Shape Extraction subunit 304b1 may be configured to:

Obtain the main shape of the standardized template image by training a processor with the ASM Algorithm of face shapes when the standardized template image is pet class image;

Obtain the main shape of the standardized template image by training the processor with Snake Model Algorithm for positioning the outer boundary shape when the standardized template image is food class image;

The main shape of the standardized template image may be obtained by Canny edge detection method for obtaining the edges of the template image and then by filtering out the small edges of the edges of the template image when the standardized template image is the image with a fuzzy contour.

The Shape Feature Extraction subunit 304b2 may be configured to:

Conduct geometric bluffing on the main shape of every template image to obtain blurred shape corresponding to the template image;

Conduct sampling on the blurred shapes corresponding to the template image to obtain the shape characters of the template image which include discrete point coordinates and geometric bluffing descriptors.

Referring back to FIG. 9, the Face Shape Matching module 303 may comprise:

Bluffing Operator Difference Acquisition unit 303a, which may be configured to obtain the difference between the bluffing operator of the shape characters of the human face and the bluffing operator of the shape characters of every template image, according to the geometric blurring descriptors of the shape characters of the human face and the geometric bluffing descriptors of every template image in the template image database.

Matching Shape Difference Acquisition unit 303b, which may be configured to obtain the shape difference between the shape characters of human face and the shape characters of every template image in the template image database according to the discrete point coordinates of the shape characters of the human face and the discrete point coordinates of every template image.

Similarity Acquisition unit 303c, which may be configured to obtain the similarities between the shape characters of human face and the shape characters of every template image according to the difference between the bluffing operator of the shape characters of the human face and the blurring operator of the shape characters of every template image, and according to the difference of matching shape between the shape character of human face and the shape character of every template image.

Matched Object Retrieval unit 303d, which may be configured to obtain the maximum similarity value from the obtained similarities and outputting the template image corresponding to this value as the most similar template image to the human face.

While the systems for face shape matching adopt the above respective modules, in the actual application, the above functions may adopt different modules to complete similar functions as required. For example, the system may assign different internal structures into different function modules to complete all or part of the functions described above.

Additionally, an ordinary skill in the art will understand that the realization of all or part of the above systems and methods may be achieved via hardware or by programs instructing related hardware (e.g., the processor 1122). The program may be store in one or more computer-readable storage media that may be a read-only memory, a disk or a CD-ROM, etc.

While example embodiments of the present disclosure relate to systems and methods of face shape matching, the systems and methods may also be applied to other applications. For example, in addition to face shape matching, the systems and methods may also be applied in shape identification or shape recognition of other objects. The present application intends to cover the broadest scope of image and/or shape identification technologies that a computer process may obtain.

Thus, example embodiments illustrated in FIGS. 1-11 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

What is claimed is:

1. A system for shape matching, comprising:
   at least one computer-readable non-transitory storage medium, comprising a set of instructions for target object shape matching; and
   at least one executing hardware unit in communication with the at least one computer-readable non-transitory storage medium that is configured to execute the set of instructions and is configured to:
      obtain a target object image for shape matching;
      determine a shape character of the target object image based on a shape of the target object image;
      determine similarities between the target object image and a plurality of template images of reference objects based on the shape character of the target object image and shape characters associated with the plurality of template images; and
      select from the plurality of template images a template image that has a largest similarity to the target object image;
   wherein each of the plurality of template image is an image of a reference object and is associated with a shape character of the image of the reference object;
   wherein the shape character of the image of the reference object comprises coordinates of a plurality of discrete points locating along edges of components on the image of the reference object and a plurality of geometric blurring descriptors of a shape of the reference object; and
   wherein the shape character of the target object image comprises coordinates of the plurality of discrete points locating along edges of components on the target object image and a plurality of geometric blurring descriptors of the shape of the target object.

2. The system of claim 1, wherein the at least one executing hardware unit is further configured to:
   obtain a template image of the plurality of template images;
   obtain a standardized template image from the template images; and
   determine the shape character of the image of the reference object based on the standardized template image.

3. The system of claim 2, wherein to obtain the shape character of the image of the reference object, the at least one executing hardware unit is further configured to:
   obtain a main shape of the reference object in the standardized template image; and
   determine the shape character of the main shape,
   wherein the main shape is a predetermined portion of the reference object.

4. The system of claim 2, wherein each of the standardized template images is categorized as at least one of a pet class image and a food class image.

5. The system of claim 3, wherein to obtain the main shape of the standardized template image, the at least one executing hardware unit is further configured to:
   apply an Active Shape Model Algorithm on the standardized template image when the reference object is an animal.

6. The system of claim 3, wherein to obtain the main shape of the standardized template image, the at least one executing hardware unit is further configured to:
   apply a Snake Model Algorithm on the standardized template image to position an outer boundary of the image of the reference object when the reference object is food.

7. The system of claim 3, wherein when the standardized template image is an image with a fuzzy contour to obtain the main shape of the standardized template image, the at least one executing hardware unit is further configured to:
   apply a Canny edge detection method on the standardized template image to obtain overall edges of the image of the reference object; and
   filter out noises on the overall edges.

8. The system of claim 3, wherein to determine the shape character of the template image the at least one executing hardware unit is further configured to:
   obtain a blurred shape corresponding to the template image by conducting geometric blurring on the main shape of the image of the reference object in the template image;
   determine the shape character of the template image by conducting sampling on the blurred shape corresponding to the template image.

9. The system of claim 1, wherein to determine the similarity between the target object image and a template image of the plurality of template images, the at least one executing hardware unit is further configured to:
   obtain a first difference that reflects a difference between a blurring operator of the shape character of the target object image and a blurring operator of the shape character of the template image according to the geometric blurring descriptors of the shape character of the target object image and the geometric blurring descriptors of the shape character of the template image;
   obtain a second difference that reflects a difference between the shape character of the target object image and the shape character of the template image according to the coordinates of the plurality of discrete points of the shape character of the target object image and the coordinates of the plurality of discrete points of the template image; and
   obtain the similarity between the shape character of the target object and the shape character of the template image according to the first difference and the second difference.

10. A computer-implemented method for shape matching, comprising:
    obtaining, by at least one computer hardware unit, a target object image for shape matching;
    determining, by at least one computer hardware unit, a shape character of the target object image based on a shape of the target object image;
    determining, by at least one computer hardware unit, similarities between the target object image and a plurality of template images of reference objects based on the shape character of the target object image and shape characters associated with the plurality of template images; and
    selecting, by at least one computer hardware unit, from the plurality of template images a template image that has a largest similarity to the shape of the target object image;

wherein each of the plurality of template image is an image of a reference object and is associated with a shape character of the image of the reference object;

wherein the shape character of the image of the reference object comprises coordinates of a plurality of discrete points locating along edges of components on the image of the reference object and a plurality of geometric blurring descriptors of a shape of the reference object; and wherein the shape character of the target object image comprises coordinates of the plurality of discrete points locating along edges of components on the target object image and a plurality of geometric blurring descriptors of the shape of the target object.

11. The computer-implemented method of claim 10, further comprising:
    obtaining, by at least one computer hardware unit, a template image of the plurality of template images;
    obtaining, by at least one computer hardware unit, a standardized template image from the template images; and
    determining, by at least one computer hardware unit, the shape character of the image of the reference object based on the standardized template image.

12. The computer-implemented method of claim 11, wherein obtaining the shape character of the image of the reference object comprising:
    obtaining, by at least one computer hardware unit, a main shape of the reference object in the standardized template image; and
    determining, by at least one computer hardware unit, the shape character of the main shape,
    wherein the main shape is a predetermined portion of the reference object.

13. The computer-implemented method of claim 11, wherein each of the standardized template images is categorized as at least one of a pet class image and a food class image.

14. The computer-implemented method of claim 12, wherein obtaining the main shape of the standardized template image comprising:
    applying, by at least one computer hardware unit, an Active Shape Model Algorithm on the standardized template image when the reference object is an animal.

15. The computer-implemented method of claim 12, wherein obtaining the main shape of the standardized template image comprising:
    applying, by at least one computer hardware unit, a Snake Model Algorithm on the standardized template image to position an outer boundary of the image of the reference object when the reference object is food.

16. The computer-implemented method of claim 12, wherein when the standardized template image is an image with a fuzzy contour obtaining the main shape of the standardized template image comprising:
    applying, by at least one computer hardware unit, a Canny edge detection method on the standardized template image to obtain overall edges of the image of the reference object; and
    filtering out noises on the overall edges.

17. The computer-implemented method of claim 12, wherein determining the shape character of the template image comprising:
    obtaining, by at least one computer hardware unit, a blurred shape corresponding to the template image by conducting geometric blurring on the main shape of the image of the reference object in the template image;
    determining, by at least one computer hardware unit, the shape character of the template image by conducting sampling on the blurred shape corresponding to the template image.

18. The computer-implemented method of claim 10, wherein determining the similarity between the target object image and a template image of the plurality of template images comprising:
    obtaining, by at least one computer hardware unit, a first difference that reflects a difference between a blurring operator of the shape character of the target object image and a blurring operator of the shape character of the template image according to the geometric blurring descriptors of the shape character of the target object image and the geometric blurring descriptors of the shape character of the template image;
    obtaining, by at least one computer hardware unit, a second difference that reflects a difference between the shape character of the target object image and the shape character of the template image according to the coordinates of the plurality of discrete points of the shape character of the target object image and the coordinates of the plurality of discrete points of the template image; and
    obtaining, by at least one computer hardware unit, the similarity between the shape character of the target object image and the shape character of the template image according to the first difference and the second difference.

* * * * *